(12) United States Patent
Wu et al.

(10) Patent No.: US 9,124,476 B2
(45) Date of Patent: Sep. 1, 2015

(54) SYSTEM AND METHOD FOR DATA DISTRIBUTION IN VHF/UHF BANDS

(75) Inventors: Shiquan Wu, Nepean (CA); Jung Yee, Ottawa (CA)

(73) Assignee: Wi-LAN, Inc., Ottawa (CA)

( * ) Notice: Subject to any disclaimer, the term of this patent is extended or adjusted under 35 U.S.C. 154(b) by 187 days.

(21) Appl. No.: 13/596,982

(22) Filed: Aug. 28, 2012

(65) Prior Publication Data

US 2012/0320897 A1 Dec. 20, 2012

Related U.S. Application Data

(63) Continuation of application No. 12/245,209, filed on Oct. 3, 2008, now Pat. No. 8,274,885.

(51) Int. Cl.
*H04J 11/00* (2006.01)
*H04J 7/00* (2006.01)
*H04L 27/26* (2006.01)

(52) U.S. Cl.
CPC ........ *H04L 27/2626* (2013.01); *H04L 27/2647* (2013.01)

(58) Field of Classification Search
CPC ..................................................... H04W 16/14
USPC ........................................................ 370/230
See application file for complete search history.

(56) References Cited

U.S. PATENT DOCUMENTS

| 4,750,036 | A | 6/1988 | Martinez |
| 5,956,642 | A | 9/1999 | Larsson et al. |
| 6,327,300 | B1 | 12/2001 | Souissi et al. |
| 6,385,434 | B1 | 5/2002 | Chuprun et al. |
| 6,389,088 | B1 | 5/2002 | Blois et al. |
| 6,505,032 | B1 | 1/2003 | McCorkle et al. |
| 6,700,939 | B1 | 3/2004 | McCorkle et al. |
| 6,735,238 | B1 | 5/2004 | McCorkle |
| 6,859,506 | B1 | 2/2005 | McCorkle |
| 6,901,112 | B2 | 5/2005 | McCorkle et al. |
| 6,909,877 | B2 | 6/2005 | Rofheart et al. |
| 6,912,372 | B2 | 6/2005 | McCorkle et al. |

(Continued)

FOREIGN PATENT DOCUMENTS

| CA | 1981500 A | 6/2007 |
| CN | 1481509 A | 3/2004 |

(Continued)

OTHER PUBLICATIONS

Extended European Search Report for related EP Patent Application No. 10785619.7 dated May 17, 2013 in 12 pages.

(Continued)

*Primary Examiner* — Shaq Taha
(74) *Attorney, Agent, or Firm* — Procopio, Cory, Hargreaves & Savitch LLP

(57) ABSTRACT

Whitespace devices can use unused television frequencies for transmission and reception of WiFi OFDM signals. Three contiguous bands, such as former channels 2, 3, and 4, may be bonded together to define a whitespace band. In order to fit a WiFi OFDM signal into this whitespace band, a whitespace device compresses the bandwidth of each WiFi OFDM signal using a specific spectrum mask. Very low transmission power is needed for the modified WiFi OFDM signals, eliminating the need for high power amplifiers and most of the WiFi OFDM designs such as PHY and MAC can be reused with minor modifications.

34 Claims, 6 Drawing Sheets

(56) References Cited

U.S. PATENT DOCUMENTS

| | | | |
|---|---|---|---|
| 6,931,078 B2 | 8/2005 | McCorkle et al. |
| 7,079,604 B1 | 7/2006 | Miller et al. |
| 7,177,341 B2 | 2/2007 | McCorkle |
| 7,292,622 B2 | 11/2007 | McCorkle |
| 7,627,056 B1 | 12/2009 | Harris et al. |
| 7,668,262 B2 | 2/2010 | Woo et al. |
| 7,689,186 B2 | 3/2010 | Matoba et al. |
| 7,710,919 B2 | 5/2010 | Woo et al. |
| 7,852,868 B2 | 12/2010 | Gardner et al. |
| 7,865,170 B2 | 1/2011 | Altizer et al. |
| 7,876,869 B1 | 1/2011 | Gupta |
| 7,969,311 B2 | 6/2011 | Markhovsky et al. |
| 8,081,997 B2 | 12/2011 | Sambhwani et al. |
| 8,150,328 B2 | 4/2012 | Chaudhri et al. |
| 8,305,917 B2 | 11/2012 | Ahuja et al. |
| 2001/0032225 A1 | 10/2001 | Tal et al. |
| 2002/0086707 A1 | 7/2002 | Struhsaker et al. |
| 2003/0021295 A1 | 1/2003 | Sahinoglu et al. |
| 2003/0096631 A1 | 5/2003 | Kayama et al. |
| 2004/0052228 A1 | 3/2004 | Tellado et al. |
| 2004/0085892 A1 | 5/2004 | Walton et al. |
| 2005/0152478 A1 | 7/2005 | Jalloul et al. |
| 2005/0156775 A1 | 7/2005 | Petre et al. |
| 2005/0254442 A1 | 11/2005 | Proctor, Jr. et al. |
| 2005/0286788 A1 | 12/2005 | Orr |
| 2006/0008016 A1 | 1/2006 | Balakrishnan et al. |
| 2006/0067354 A1 | 3/2006 | Waltho et al. |
| 2006/0083205 A1 | 4/2006 | Buddhikot et al. |
| 2006/0128428 A1 | 6/2006 | Rooyen |
| 2006/0203794 A1 | 9/2006 | Sampath et al. |
| 2006/0215606 A1 | 9/2006 | Yeon et al. |
| 2007/0087700 A1 | 4/2007 | Tanida |
| 2007/0091998 A1 | 4/2007 | Woo et al. |
| 2007/0100922 A1 | 5/2007 | Ashish |
| 2007/0115878 A1 | 5/2007 | Ashish et al. |
| 2007/0117537 A1 | 5/2007 | Hui et al. |
| 2007/0133387 A1 | 6/2007 | Arslan et al. |
| 2007/0183591 A1 | 8/2007 | Geile et al. |
| 2007/0200727 A1 | 8/2007 | Sakamoto |
| 2007/0202867 A1 | 8/2007 | Waltho et al. |
| 2007/0223582 A1 | 9/2007 | Borer |
| 2007/0249341 A1 | 10/2007 | Chu et al. |
| 2007/0253394 A1 | 11/2007 | Horiguchi et al. |
| 2008/0004839 A1 | 1/2008 | Papadimitriou et al. |
| 2008/0010208 A1 | 1/2008 | Callaway |
| 2008/0075191 A1 | 3/2008 | Haartsen |
| 2008/0080604 A1 | 4/2008 | Hur et al. |
| 2008/0086286 A1 | 4/2008 | Shellhammer |
| 2008/0086749 A1 | 4/2008 | Goldberg et al. |
| 2008/0089281 A1 | 4/2008 | Yoon et al. |
| 2008/0089306 A1 | 4/2008 | Hu |
| 2008/0102822 A1 | 5/2008 | Feng et al. |
| 2008/0108366 A1 | 5/2008 | Hu |
| 2008/0112427 A1 | 5/2008 | Seidel et al. |
| 2008/0112467 A1 | 5/2008 | Shellhammer |
| 2008/0130519 A1 | 6/2008 | Bahl et al. |
| 2008/0165680 A1 | 7/2008 | Chang |
| 2008/0165754 A1 | 7/2008 | Hu |
| 2008/0166974 A1 | 7/2008 | Teo et al. |
| 2008/0192686 A1 | 8/2008 | Cho et al. |
| 2008/0207136 A1 | 8/2008 | Tang et al. |
| 2008/0207204 A1 | 8/2008 | Vlantis et al. |
| 2008/0212725 A1 | 9/2008 | Tang |
| 2008/0259859 A1 | 10/2008 | Cordeiro et al. |
| 2008/0261639 A1 | 10/2008 | Sun et al. |
| 2008/0268832 A1 | 10/2008 | Peng |
| 2008/0268892 A1 | 10/2008 | Hamdi et al. |
| 2008/0293353 A1 | 11/2008 | Mody et al. |
| 2008/0293410 A1 | 11/2008 | Chan et al. |
| 2008/0299918 A1 | 12/2008 | Jallon |
| 2008/0305750 A1 | 12/2008 | Alon et al. |
| 2009/0060001 A1 | 3/2009 | Waltho |
| 2009/0061779 A1 | 3/2009 | Gurney et al. |
| 2009/0061887 A1 | 3/2009 | Hart et al. |
| 2009/0067354 A1 | 3/2009 | Gao |
| 2009/0080389 A1 | 3/2009 | Messerges et al. |
| 2009/0086618 A1 | 4/2009 | Muschallik et al. |
| 2009/0124208 A1 | 5/2009 | Mody et al. |
| 2009/0144791 A1 | 6/2009 | Huffman et al. |
| 2009/0196180 A1 | 8/2009 | Bahl et al. |
| 2009/0197627 A1 | 8/2009 | Kuffner et al. |
| 2009/0235316 A1 | 9/2009 | Wu et al. |
| 2009/0247201 A1 | 10/2009 | Ye et al. |
| 2009/0296751 A1 | 12/2009 | Kewitsch et al. |
| 2009/0323835 A1 | 12/2009 | Rao et al. |
| 2010/0045876 A1 | 2/2010 | Gao et al. |
| 2010/0069013 A1 | 3/2010 | Chaudhri et al. |
| 2010/0075611 A1 | 3/2010 | Budampati et al. |
| 2010/0075704 A1 | 3/2010 | McHenry et al. |
| 2010/0091919 A1 | 4/2010 | Xu et al. |
| 2010/0124254 A1 | 5/2010 | Wu et al. |
| 2010/0137014 A1 | 6/2010 | Rao et al. |
| 2010/0166053 A1 | 7/2010 | Fukuhara et al. |
| 2010/0309317 A1 | 12/2010 | Wu et al. |
| 2010/0311341 A1 | 12/2010 | Gaddam et al. |
| 2011/0002309 A1 | 1/2011 | Park et al. |
| 2011/0043710 A1 | 2/2011 | Samarasooriya et al. |
| 2011/0150105 A1 | 6/2011 | Koga et al. |
| 2013/0051279 A1* | 2/2013 | Lee et al. ............... 370/254 |
| 2013/0114586 A1* | 5/2013 | Kim et al. ............... 370/338 |

FOREIGN PATENT DOCUMENTS

| | | |
|---|---|---|
| CN | 1677970 A | 10/2005 |
| CN | 1777167 A | 5/2006 |
| CN | 1791170 A | 6/2006 |
| CN | 1842178 A | 10/2006 |
| CN | 1878011 A | 12/2006 |
| CN | 1941762 A | 4/2007 |
| CN | 1981506 A | 6/2007 |
| CN | 101262702 A | 9/2008 |
| CN | 101292486 A | 10/2008 |
| EP | 1 750 466 A1 | 2/2007 |
| EP | 1845636 A1 | 10/2007 |
| EP | 2680630 A1 | 1/2014 |
| JP | 11-275165 | 10/1999 |
| JP | 2000-175110 | 6/2000 |
| JP | 2002-529018 A | 9/2002 |
| JP | 2005-057644 | 3/2005 |
| JP | 2005-522061 | 7/2005 |
| JP | 2007-036490 | 2/2007 |
| JP | 2007-036491 | 2/2007 |
| JP | 2007-081860 A | 3/2007 |
| JP | 2007-166068 | 6/2007 |
| JP | 2007-166488 A | 6/2007 |
| JP | 2007150971 A | 6/2007 |
| JP | 2007-300419 A | 11/2007 |
| JP | 2008507900 A | 3/2008 |
| JP | 2008-172760 A | 7/2008 |
| JP | 2008-533913 A | 8/2008 |
| JP | 2008-259106 A | 10/2008 |
| JP | 2008545285 A | 12/2008 |
| WO | 0223758 A1 | 3/2002 |
| WO | 2006/046424 A1 | 5/2006 |
| WO | 2007043827 A1 | 4/2007 |
| WO | 2007049760 A1 | 5/2007 |
| WO | 2007053196 A1 | 5/2007 |
| WO | 2007056020 A1 | 5/2007 |
| WO | 2007056081 A1 | 5/2007 |
| WO | 2007060493 A2 | 5/2007 |
| WO | 2007081503 A1 | 7/2007 |
| WO | 2007094604 A1 | 8/2007 |
| WO | 2007096819 A2 | 8/2007 |
| WO | 2007100323 A1 | 9/2007 |
| WO | 2007/122297 A1 | 11/2007 |
| WO | 2008013429 A2 | 1/2008 |
| WO | 2008014293 A1 | 1/2008 |
| WO | 2008032999 A2 | 3/2008 |
| WO | 2008038207 A2 | 4/2008 |
| WO | 2008060203 A1 | 5/2008 |
| WO | 2008086243 A1 | 7/2008 |
| WO | 2008090509 A2 | 7/2008 |
| WO | 2008/096921 A1 | 8/2008 |
| WO | 2008097253 A1 | 8/2008 |

(56) References Cited

FOREIGN PATENT DOCUMENTS

| WO | 2008107854 A1 | 9/2008 |
|---|---|---|
| WO | 2008109641 A2 | 9/2008 |
| WO | 2008114216 A2 | 9/2008 |
| WO | 2008/129716 A1 | 10/2008 |
| WO | 2008140417 A1 | 11/2008 |
| WO | 2008144323 A1 | 11/2008 |
| WO | 2009/018300 A1 | 2/2009 |
| WO | 2009114931 A1 | 9/2009 |

OTHER PUBLICATIONS

Wu et al. "Spectrum Manager White Paper: 22-09-0113-00-0000-spectrum-manager-white-paper." IEEE Draft. Piscataway, NJ, US. vol. 802.22. Jun. 19, 2009, pp. 1-13. XP017656573, retrieved on Jun. 19, 2009.

Ecclesine. "IEEE 802 Ofcom Comments: 18-09-0054-06-0000-ieee-802-ofcom-comments." IEEE Draft. Piscataway, NJ, US. vol. 802.18, No. 6. May 1, 2009, pp. 1-11. XP017662465, retrieved on May 1, 2009.

Office Action and English translation for related JP Patent Application No. 2011-503315, dated Apr. 16, 2013, in 4 pages.

Office Action and Search Report (with translation) for related CN Patent Application No. 200980142699.2, dated Jun. 3, 2013, in 11 pages.

Office Action and Search Report (with translation) for related CN Patent Application No. 201080003588.6, dated Jul. 1, 2013, in 7 pages.

Iancu, D., et al. "Analog Television, WiMax and DVB-H on the Same SoC Platform." Proceedings of the International Symposium on System-on-Chip, Tampere, Finland. Nov. 2006.

Stevenson. "IEEE starts standard to tap open regions in the TV spectrum for wireless broadband services." Oct. 12, 2004. http://standards.ieee.org/announcements/pr_80222.html, 3 pages.

International Search Report and Written Opinion as issued in International Patent Application No. PCT/CA2010/000126 on May 5, 2010, 8 pages.

International Search Report and Written Opinion as issued in International Patent Application No. PCT/CA2010/000823 on Oct. 26, 2010, 11 pages.

International Search Report and Written Opinion as issued in International Patent Application No. PCT/CA2010/000856 on Sep. 14, 2010, 8 pages.

International Search Report and Written Opinion for PCT/CA2009-000371, issued May 29, 2009, 9 pages.

International Search Report and Written Opinion from PCT/CA2009/001664 dated Feb. 1, 2010, 8 pages.

International Search Report and Written Opinion issued Dec. 17, 2009 in PCT/CA2009/001392, 6 pages.

Jones et al. "Initial Evaluation of the Performance of Prototype TV-Band White Space Devices." OET Report, FCC/OET 07-TR-1006, Tech. Rsch Br. Lab. Div. Office.,Jul. 31, 2007 in 85 pages.

Liang, Ying-Chang and Hoang, Anh Tuan. Cognitive Radio on TV Bands: A New Approach to Provide Wireless Connectivity for Rural Areas, 2008 IEEE Wireless Communications, Jun. 2008, pp. 16-22.

Marcus et al. "Report of the Unlicensed Devices and Experimental Licenses Working Group", Federal Communications Commission Spectrum Policy Task Force. Nov. 15, 2002. Internet Wayback Machine capture http://replay.waybackmachine.org/20041119020032/http://www.fcc.gov/sptf/files/E&UWGFinalReport.doc, Nov. 19, 2004, 24 pages.

Motorola et al., IEEE 802.22-06/0005r5, PHY Overview, Mar. 2006, 21 pages.

Narlanka, S. et al. "A Hardware Platform for Utilizing TV Bands with a Wi-Fi Radio." 15th IEEE Workshop on Local & Metropolitan Networks, Jun. 10-13, 2007, pp. 49-53.

Naveen, M.B., et al. WiMAX. Jul. 14, 2008. pp. 1-20, http://ece-www.colorado.edu/~liue/teaching/comm_standards/WiMax/WiMax_802_16e . . . .

Rhodes, C., Where are the White Spaces in the TV Broadcast Spectrum? May 17, 2008 at National Translator Association pp. 1-19.

Extended European Search Report for EP Patent Application No. 09827082.0, mailed on Dec. 12, 2013, in 12 pages.

IEEE 802.22 Working Group of the LAN/MAN Standards Committee. "IEEE P802.22 ™/DRAFTv1.0: Draft Standard for Wireless Regional Area Networks Part 22: Cognitive Wireless RAN Medium Access Control (MAC) and Physical Layer (PHY) specifications: Policies and procedures for operation in the TV Bands." Apr. 8, 2008, 426 pages.

Akyildiz et al. "NeXt generation/dynamic spectrum access/cognitive radio wireless networks: A survey." Computer Networks. 50(13):2127-2159, Sep. 15, 2006.

"White Space", [online], Jan. 30, 2009 Examination Committee related to General Legal Systems for Communication and Broadcasting (12th), Materials 6, Ministry of Internal Affairs and Communications, (searched Jul. 11, 2013) Internet/URL: http:www.soumu.go.jp/main_sosiki/joho_tsusin/policyreports/joho_tsusin\houtai\pdf\090130_1.s6.pdf. Reference is made in relation to journal material to http:www.soumu.go.jp/main_sosiki/joho_tsusin/policyreports/joho_tsusin\houtai\090130_1.html. English translation unavailable.

Cordeiro et al. "IEEE 802.22: An Introduction to the First Wireless Standard based on Cognitive Radios." Journal of Communications. 1(1):38-47 (Apr. 2006).

Office Action (with English translation) dated Apr. 28, 2014 for related JP Patent Application No. 2012-513420 in 10 pages.

Sasaki. "Trends on Standardization Activities in IEEE802.22", Technical Research Bulletin of the Institute of Electronics, Information and Communication Engineers. 106(395):127-133 (Nov. 22, 2006). English abstract provided.

Office Action with English Translation for related JP Patent Application No. 2011-535848, dated Oct. 22, 2013, in 4 pages.

Office Action with English Translation for related JP Patent Application No. 2012-182904, dated Oct. 22, 2013, in 6 pages.

IEEE Standard 802.16. "Part 16: Air Interface for Fixed Broadband Wireless Access Systems." IEEE Standard for Local and Metropolitan Area Networks. Oct. 1, 2004.

Decision of Rejection for related JP Patent Application No. 2012-182904, mailed on May 8, 2014, in 6 pages (with English translation).

IEEE Computer Society and the IEEE Microwave Theory and Techniques Society. "802.16. IEEE Standard for Local and Metropolitan Area Networks. Part 16: Air Interface for Fixed Broadband Wireless Access Systems." Oct. 1, 2004, 3 pages.

Oh et al. "White-Space Sensing Device for Detecting Vacant Channels in TV Bands." Proc. CROWNCOM, Singapore, May 2008.

Office Action and Search Report (with English translation) for related TW Patent Application No. 099116618, dated Aug. 15, 2013, in 8 pages.

Kim et al. "A CR Platform for Applications in TV Whitespace Spectrum." Cognitive Radio Oriented Wireless Networks and Communications. IEEE 3rd International Conference, Piscataway, NJ. 2008. pp. 1-8.

Depardo et al. "Quantifying the Impact of Unlicensed Devices on Digital TV Receivers." Retrieved from http://www.newamerica.net/files/NAF%20Spectrum%20Technical%20Report%20_FINALSUBMITTED_0.pdf. Accessed on Apr. 24, 2013. pp. 1-29, Jan. 31, 2007.

Office Action and Search Report for related CN Patent Application No. 200980134967.6 dated May 6, 2013 in 9 pages.

Extended European Search Report for related EP Patent Application No. EP 09817150.7 dated May 14, 2013 in 7 pages.

Extended European Search Report for EP 10735465.6, dated Nov. 8, 2012, in 7 pages.

Office Action for related CN Patent Application No. 2010800226756 dated Dec. 30, 2013 in 8 pages.

Office Action and translation for related JP Patent Application No. 2012-513425, dated Feb. 10, 2014 in 4 pages.

* cited by examiner

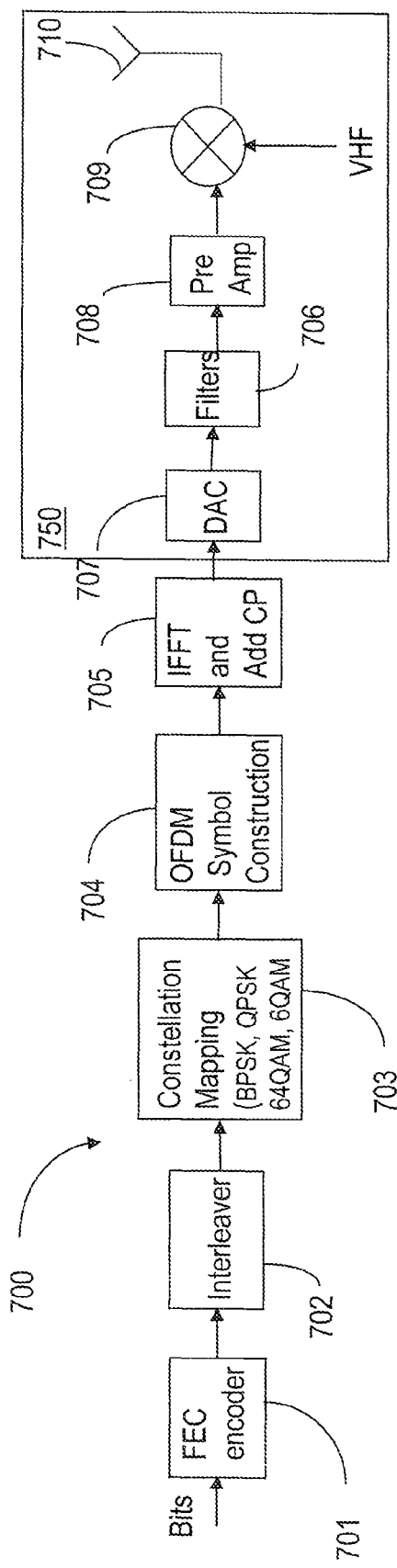
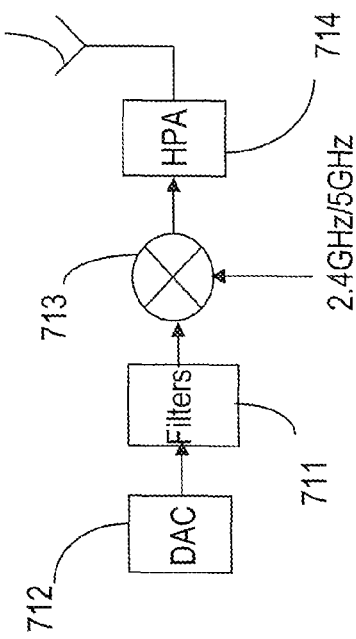
FIGURE 7A
FIGURE 7B

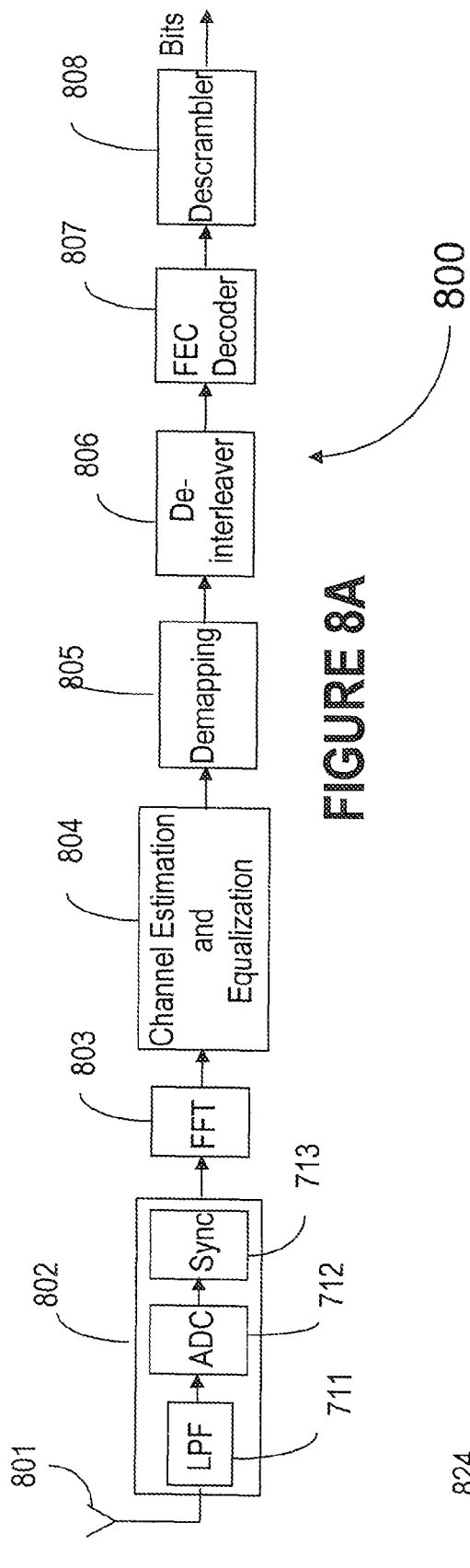
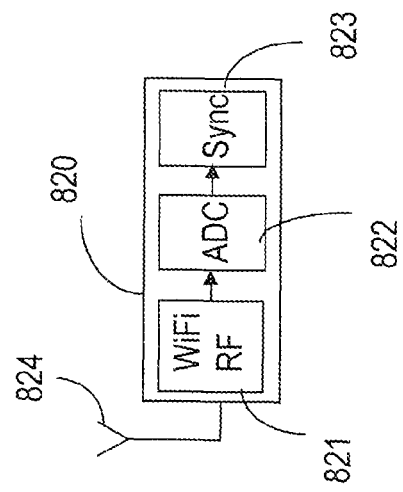

SYSTEM AND METHOD FOR DATA DISTRIBUTION IN VHF/UHF BANDS

CROSS-REFERENCE TO RELATED APPLICATIONS

This application is a continuation of U.S. patent application Ser. No. 12/245,209, filed Oct. 3, 2008, titled "System and Method for Data Distribution in VHF/UHF Bands," which is hereby incorporated by reference.

BACKGROUND

This invention relates generally to distribution of data signals in a home environment, and more particularly to a system and method for data distribution in the VHF/UHF band.

WiFi (Wireless Fidelity) is the trade name for the global set of 802.11 standards drafted for wireless Local Area Networks (LAN); any standard Wi-Fi device will work anywhere in the world. WiFi is one of the most popular wireless technologies; it is widely available in public hotspots, homes, and campuses worldwide, being supported by nearly every modern personal computer, laptop, most advanced game consoles, printers, and many other consumer devices. Routers which incorporate a Digital Subscriber Line (DSL) modem or a cable modem and a Wi-Fi access point, often set up in homes and other premises, provide Internet access and internetworking to all devices connected (wirelessly or by cable) to them.

Wi-Fi uses both single carrier direct-sequence spread spectrum radio technology (812.11b) and multi-carrier Orthogonal Frequency Division multiplexing (OFDM) radio technology (e.g. 802.11a, g, j, n). The Institute for Electronic and Electrical Engineers (IEEE) has established a set of standards for Wireless Local Area Network (WLAN) computer communication, collectively known as the IEEE 802.11 standard that are applicable to Wi-Fi signals.

The 802.11a standard uses OFDM radio technology in the 5 GHz U-NII band, which offers 8 non-overlapping channels and provides data rates of up to 54 Mbps. Another standard that uses OFDM is 802.11g, which attempts to combine the best features of the 802.11a and 802.11b standards. It uses enables data rates of 6, 9, 12, 18, 24, 36, 48, and 54 Mbps, and the 2.4 GHz frequency for greater range. The 802.11j standard is an amendment designed especially for Japanese markets. It allows WLAN operation in the 4.9 to 5 GHz band to conform to Japanese rules for radio operation for indoor, outdoor, and mobile applications. Finally, the 802.11n standard is a proposed amendment which improves upon the previous 802.11 standards by adding multiple-input multiple-output (MIMO) and many other newer features. Though there are already many products on the market based on the latest draft of this proposal, the 802.11n standard will not be finalized until December 2009.

In the U.S., 802.11a and 802.11g devices may be operated without a license. The 802.11a standard uses 20 MHz channels and operates in three unlicensed bands, known as the Unlicensed National Information Infrastructure (U-NII) bands; four 20 MHz channels are specified in each of these bands. The lower U-NII band, extending from 5.15 to 5.25 GHz, accommodates four channels with a 40 mW power limit; the middle U-NII band, extending from 5.25 to 5.35 GHz accommodates four channels with a 200 mW power limit; and the upper U-NII band, extending from 5.725 to 5.825 GHz, accommodates four 20 MHz channels with an 800 mW power limit.

An 802.11a signal uses OFDM modulation with 52 subcarriers, which include 48 data subcarriers and four pilot subcarriers; the subcarriers can be modulated using BPSK, QPSK, 16 QAM, or 64 QAM. The total symbol duration is 4 µs, and includes a useful symbol duration of 3.2 µs and a guard interval of 0.8 µs, with a peak data rate of 54 Mbps. Subcarriers are spaced apart by 312.5 kHz so that the signal actually occupies a bandwidth of 16.25 MHz in theory.

In the United States, there are roughly 210 television (TV) broadcast regions and 1700 TV broadcasting stations. Currently, each TV station is assigned around eight radio frequency (RF) channels for NTSC broadcast, each channel occupying 6 MHz in the VHF/UHF spectrum. The Federal Communications Commission (FCC) has mandated that all full-power television broadcasts will use the Advanced Television Systems Committee (ATSC) standards for digital TV by no later than Feb. 17, 2009. All NTSC television transmissions will be terminated by that date. Following the NTSC TV switch-off, the FCC will allocate channels 2 through 51 to digital TV; channels 52 through 69 that occupy the lower half of the 700 MHz band have been already reallocated through auction to various advanced commercial wireless services for consumers.

The ATSC standard mandates a bandwidth of 6 MHz for each TV channel, use of Trellis Eight-Vestigial Side Band (8-VSB) modulation, and Reed-Solomon encoding. The TV receiver has some basic requirements to property decode the ATSC signal and provide good quality TV pictures. These requirements include that the TV Signal to Noise Ratio (SNR) is no less than 15.2 dB, a thermal noise floor of −106.2 dBm (dBm is the abbreviation for the power ratio measurement units), and a sensitivity of between −81 and −84 dBm etc.

As each TV station operating in a certain geographic region/area uses only a limited number of channels from the TV band, some digital channels remain unused in the respective area: this locally available spectrum is called "whitespace."

It is expected that the FCC will allow the whitespace bands to be used only by devices that do not interfere with existing TV broadcast, wireless microphones, or Global Positioning System (GPS) systems deployed in that area. Consequently, the signals radiated by any whitespace devices/equipment operating in the ATSC spectrum must follow the FCC regulations so that the quality of the primary TV service will not be degraded by the signals using the nearby whitespace. Thus, the new whitespace devices should be designed so as to not affect the TV tuner sensitivity (−81~−84 dB) and the TV receiver performance at SNR=15.2 dB.

A known solution for distributing multimedia content within a home is wireless high definition TV (HDTV). However, wireless HDTV requires a very high data rate (greater than 1 Gbps) and the 60 GHz band is not suitable for transmission over distances greater than 10 m. In addition, the quality of such a wireless link is not satisfactory and the cost is high.

Another known solution for distributing data and video within a home is WiFi. However, the WiFi band has uncontrollable interferences and the quality cannot be guaranteed.

Thus, there is a need to provide an inexpensive and efficient way to broadcast multimedia content within a confined environment, using wireless solutions. There is also a need to recycle the spectrum that is not used in a certain geographical area.

SUMMARY

Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts are provided by the entire disclosure.

It is an object of the invention to provide a method and system for wireless distribution of data and/or video within a home using OFDM technology, and in particular using WiFi OFDM signals. While the specification describes WiFi OFDM variants of the invention; it is to be understood that the invention applies to other technologies and is not restricted to WiFi OFDM signals.

Another object of the invention to provide a method and system for confining (retrofitting) WiFi OFDM signals into the whitespace that will become available once digital TV signal is phased in. As discussed in the Background section of this specification, the bandwidth used by the WiFi OFDM signals in the 5 GHz band is 20 MHz, and is therefore, slightly greater than the bandwidth of three consecutive TV channels in North America, which is 3×6=18 MHz. Also, a standard WiFi OFDM signal cannot fit within the whitespace band of three consecutive TV channels directly, due to high shoulders of its signal spectrum, which will severely interfere with the adjacent TV channels. The solution disclosed here confines WiFi OFDM signals into the whitespace, both in terms of bandwidth and emitted power, without causing interference with the existing TV broadcast.

It is to be noted that the invention described herein is equally applicable to whitespace of various widths. The particular example of retrofitting a WiFi OFDM signal within an 18 MHz bands is a practical solution for North America, that result in minimal changes to the existing WiFi device. However, the invention is not restricted to a whitespace of 18 MHz; applying the technique described here, narrower whitespace bands may be used. As well, as other countries that have a different TV channel width, whitespace freed by two TV channels may be used according to the invention. For example, a TV channel in Japan occupies 8 MHz, so that there is no need to use the whitespace freed by three TV channels; two could be enough. As well in the width of a TV channel in European countries is 7 MHz; in this case the WiFi OFDM signal can be used with the more relaxed embodiment of this invention, or less than three TV channels may be used by modifying the spectrum mask according to the invention in an appropriate way.

Still another object of the invention is to provide wireless distribution of data and/or video with minimal changes to the hardware of the existing WiFi devices.

In various exemplary embodiments, a method of transmitting user data over a local area network (LAN) within a VHF/UHF band may comprise identifying in the VHF/UHF band a whitespace band $B_{WS}$ available in an area of operation of the LAN; generating a baseband WiFi OFDM signal from user data; reconfiguring the baseband WiFi OFDM signal into a modified WiFi OFDM signal using a transmit spectrum mask adapted to confine the bandwidth of the modified WiFi OFDM signal into the whitespace band $B_{WS}$, and to attenuate the modified WiFi OFDM signal at the edges of the whitespace band $B_{WS}$ for maintaining a performance of any neighboring TV channel unchanged; and transmitting the modified WiFi OFDM signal over the whitespace band.

Advantageously, the invention provides a solution for reusing the whitespace available in a respective area, at low cost and with a better performance than the current solutions. These advantages result from use of the lower part of the spectrum (VHF/UHF rather than 5 GHz), which results for example in a simplified design of the RF part of the existing devices. This is because at lower frequencies, the distances at which signals may be transmitted are greater that in the higher frequency bands; a direct result is that the transmitter design may use only a preamplifier rather than a power amplifier as in the current designs, resulting in a cost decrease.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

BRIEF DESCRIPTION OF THE DRAWINGS

The invention is next described with reference to the following drawings, where like reference numerals designate corresponding parts throughout the several views.

FIG. 7A shows an exemplary transmitter according to an embodiment of the present invention;

FIG. 7B shows the RF units of a conventional WiFi transmitter that are replaced in the transmitter shown in FIG. 7A;

FIG. 8A shows an exemplary receiver according to an embodiment of the present invention; and FIG. 8B shows the RF units of a conventional WiFi receiver that are replaced in the receiver shown in FIG. 8A.

DETAILED DESCRIPTION

Figure 1A:
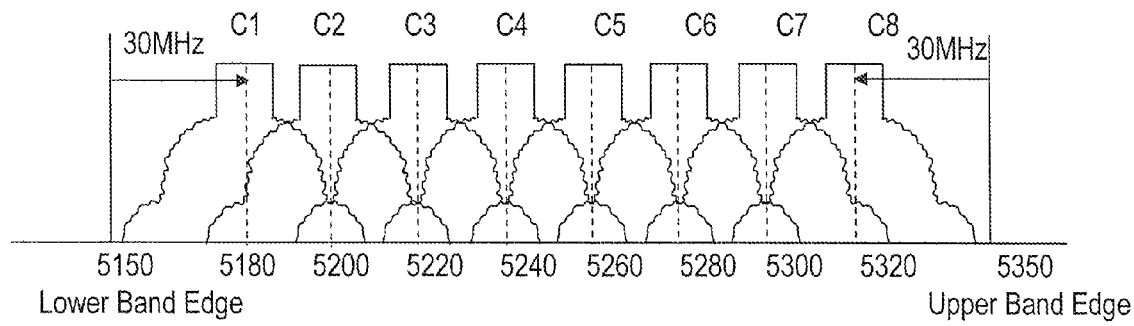
FIG. 1A shows the eight WiFi carriers in the lower and middle U-NII bands.

Referring now to the drawings, in which like numerals refer to like components or steps, there are disclosed broad aspects of various exemplary embodiments. It is again noted that WiFi and North America ATSC standard are used by way of example. Other OFDM signals may be retrofitted in the whitespace freed by transition to digital TV in other parts of the world. Also, use of whitespace provided by three consecutive TV channels is described here as the preferred embodiment of the invention: whitespace of different width may also be used for transmitting OFDM signals in the VI-IF/UHF spectrum.

Figure 1B:
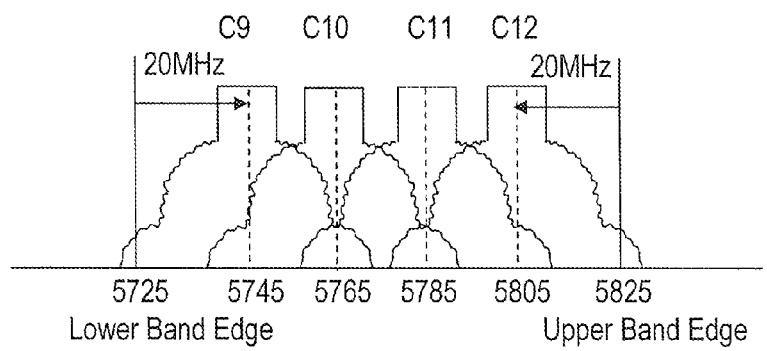
FIG. 1B shows the four WiFi carriers in the upper U-NII band.
Figure 2:
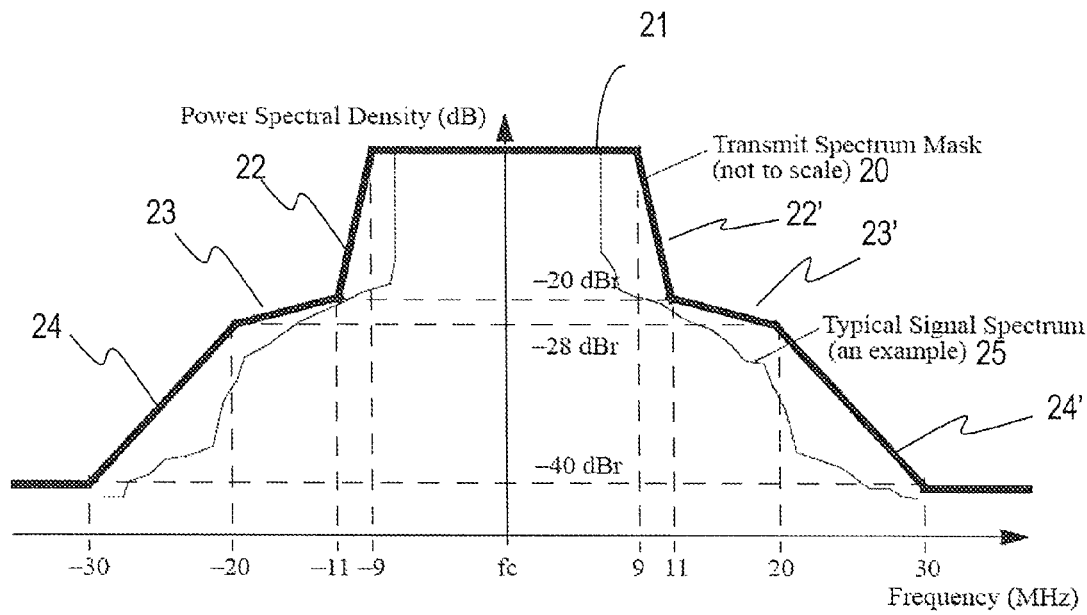
FIG. 2 depicts the transmit spectrum for a WiFi OFDM signal.

FIGS. 1A and 1B show the 802.11a carriers in the 5 GHz band, where FIG. 1A shows eight WiFi carriers C1-C8 in the lower and middle U-NII bands, and FIG. 2 shows the four WiFi carriers C9-C12 in the upper U-NII band. Each central frequency is spaced 20 MHz relative to neighboring carriers. In FIG. 1A, for a lower band edge of 5.15 GHz and an upper band edge of 5.35 GHz, the total bandwidth is 200 MHz. The first central frequency C1 is 30 MHz above lower edge of the lower U-NII band and the eighth central frequency C8, is 30 MHz below the upper edge of the middle U-NII band. In the upper U-NII band shown in FIG. 1B, the total bandwidth is 100 MHz, extending between a lower band edge of 5.725 GHz and an upper band edge of 5.825 GHz. The first carrier C9 is 20 MHz above the lower edge of the upper U-NII band and the fourth carrier C12 is 20 MHz below the upper edge of the band.

Besides the central frequency of each channel, the 802.11 standard also specifies a spectral mask defining the permitted distribution of power across each channel. FIG. 2 depicts the transmit spectrum mask 20 according to the 802.11a standard and the power spectrum 25 of a typical WiFi OFDM signal. As shown in FIG. 2, the mask has a maximum plateau 21 at 9 MHz around the central frequency $F_C$. Then, the signal is attenuated by about 20 dBr ("dBr" stands for "relative") from its peak energy in the range of 9-11 MHz from the central frequency $F_C$, shown at 22, 22', so that in practice the channels are effectively 22 MHz wide. A smaller rate of power decay creates a skirt 23, 23' over the range 11-20 MHz away from $F_C$, where the power level only drops from −20 dBr to −28 dBr. The mask then declines below −40 dBr, shown at 24, 24' at frequencies more than 30 MHz away from f. As seen in FIG. 2, the wide skirt 24, 24' of a standard WiFi OFDM signal extends well outside of the 20 MHz range. It is however assumed that the signal on any channel is sufficiently attenuated outside the 20 MHz bandwidth to minimally interfere with a transmitter on any other channel.

Figure 3:
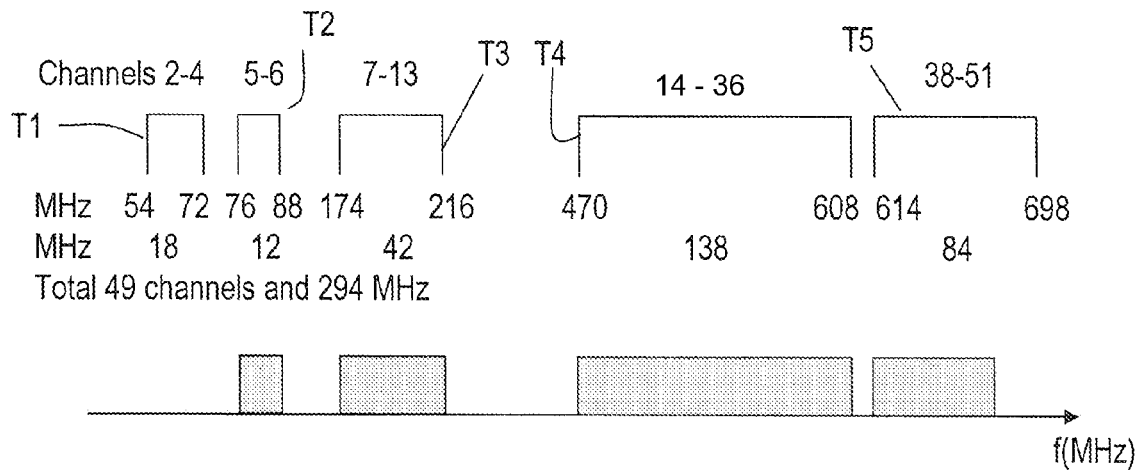
FIG. 3 illustrates the U.S. ATSC broadcast band.

FIG. 3 illustrates the U.S. digital television broadcast band after Feb. 17, 2009. The ATSC television signals will be broadcast in the VHF (very high frequency) band and/or the lower part of the UHF (ultra high frequency) band. As seen in FIG. 3, the digital TV channels are grouped into five bands denoted with T1-T5. The band T1 occupied by channels 2-4 has 18 MHz, extending from 54 MHz to 72 MHz. The band T2 occupied by channels 5-6 has 12 MHz between 76 MHz to 88 MHz, the band T3 occupied by channels 7-13 has 42 MHz, between 174 MHz and 216 MHz. Further, the band T4 carrying channels 14-36 occupies 138 MHz, extending from 470 MHz to 608 MHz and the band T5 occupied by channels 38-51 has 84 MHz, from 614 MHz to 698 MHz. Thus, this group of 49 channels covers a total spectrum of 294 MHz (18+12+42+138+84).

Since channels 2, 3, and 4 will be reserved for some specific applications, after this reservation, the commercial ATSC TV channels will encompass 274 MHz, ranging from 76 MHz to 698 MHz, as shown in gray on the lower part of FIG. 3.

One embodiment of the present invention includes analyzing bandwidth allocation in the VHF/UHF band, detecting a frequency band denoted generally with $B_{WS}$ that is unused, and transmitting data and video over a WiFi OFDM signal in this unused bandwidth. In the case that the available whitespace is 18 MHz (e.g. the bandwidth not used by three consecutive RF channels based on the North America TV standards), one embodiment of the invention reconfigures the WiFi OFDM signal in order to retrofit a 20 MHz WiFi signal into the 18 MHz band of these three consecutive TV channels.

In addition, band T1 occupied by channels 2, 3, and 4 may also became available as whitespace for use by other applications. T1 has traditionally been set aside for set top boxes or Video Cassette Recorders (VCRs), Digital Versatile Discs (DVDs), etc. However, T1 may stay free most of the time, once non-radio frequency (RF) means of TV signal transport, such as the High Definition Multimedia Interface (HDMI), become prevalent.

Figure 4:
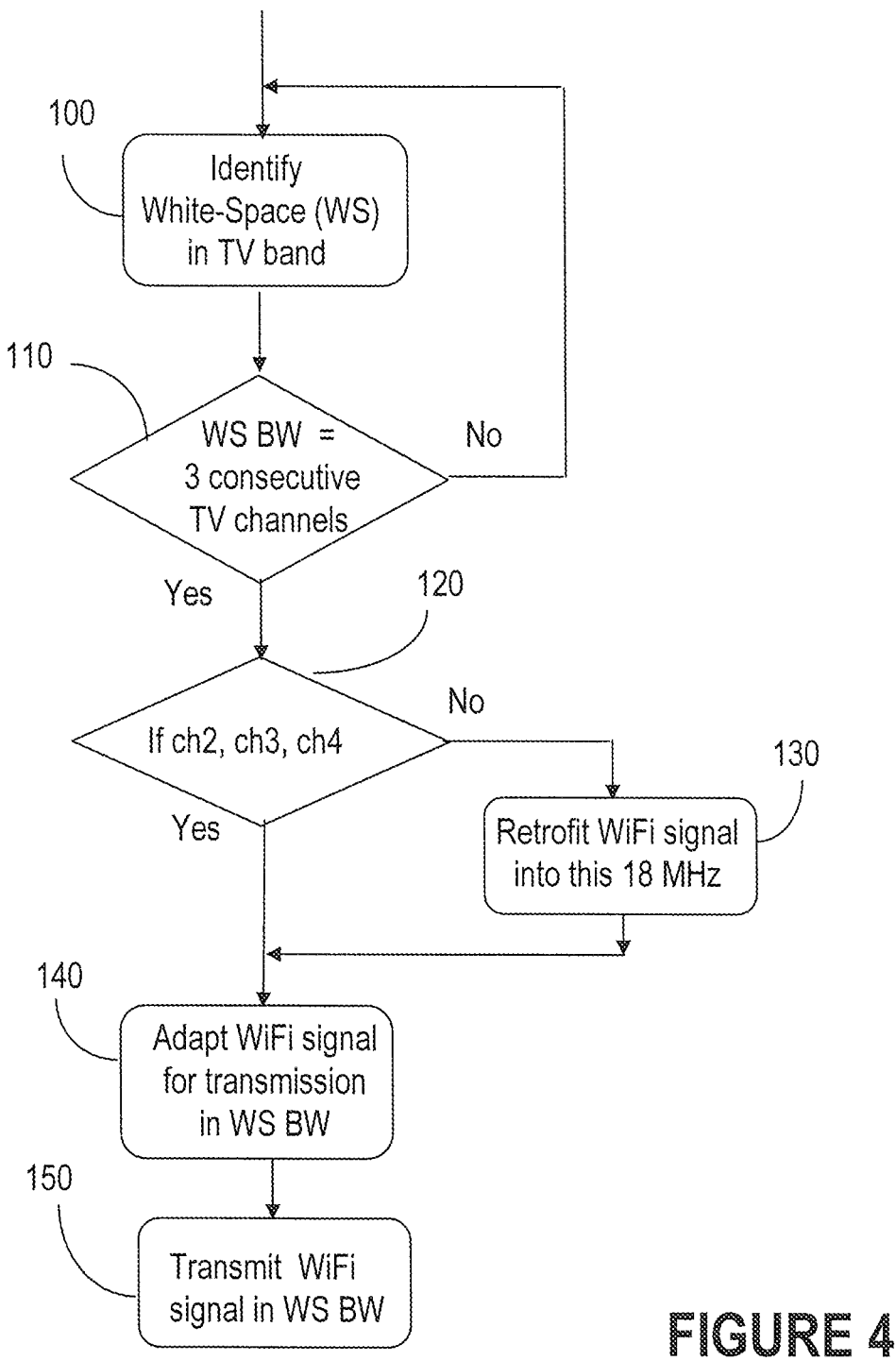
FIG. 4 is a flowchart of the method according to an embodiment of the invention.

FIG. 4 shows a flowchart depicting the steps of the method according to one embodiment of the invention. In step 100, the whitespace is detected using, for example, a wavelet analyzer as described in U.S. patent application Ser. No. 12/078, 979, titled "A System and Method for Utilizing Spectral Resources in Wireless Communications," filed Apr. 9, 2008, which is incorporated herein by reference. The wavelet analyzer is operable to monitor the wireless signals present within the frequency and time domains of a communication spectrum (here, the VHF/UHF spectrum) with a view to automatically and continuously identify bandwidth that is not used currently (whitespace) in the area of interest. It is to be noted that other means for identifying idle bandwidth suitable for the transmission of WiFi OFDM signals may also be used, without departing from the scope of this invention.

In step 110, it is established if a whitespace bandwidth corresponding to three consecutive TV channels is available. As shown by branch "No" of the decision block 110, the search for identifying whitespace extending over three consecutive TV channels continues until successful; it is to be noted that since the number of TV channels broadcast in each geographical area is limited (currently there are 8 TV channels per station), the likelihood to find such whitespace is quite high.

As one illustrative example, assume that three free consecutive channels are identified as shown by branch "Yes" of decision block 110; for example, these are channels C8, C9 and C10 from band T3 (see FIG. 3). In this case, step 130 is performed next since these channels are not TV channels C2-C4, as established at decision block 120. These free TV channels occupy 18 MHz, and as discussed above, a WiFi OFDM signal normally requires a 20 MHz bandwidth and has a wide skirt that extends well beyond this range. According to this embodiment of the invention, standard signals are modified so as to retrofit them into the 18 MHz band, as shown by step 130. The modified WiFi OFDM signal is also formatted so as to be consistent with all FCC requirements regarding interference with neighboring TV channels.

Next, the modified WiFi OFDM signal is adapted for transmission in the whitespace identified in step 100. This means that the baseband WiFi OFDM signal is modulated on subcarriers selected in the whitespace, as shown in step 140, and then transmitted over the whitespace band in step 150. Details on how the WiFi OFDM signal is modified and adapted for transmission in this whitespace band will be described in further detail in connection with FIG. 5, which provides a novel emission mask for retrofitting a 20 MHz standard WiFi OFDM signal into an 18 MHz band.

If the free channels identified in step 100 are TV channels C2-C4, as shown by branch "Yes" of decision block 120, step 140 and 150 are performed, whereby the WiFi OFDM signal is adapted for transmission in the whitespace otherwise occupied by C2-C4. Details on how the WiFi OFDM signal is adapted for transmission in this whitespace band will be described in further detail in connection with FIG. 6.

Figure 5:
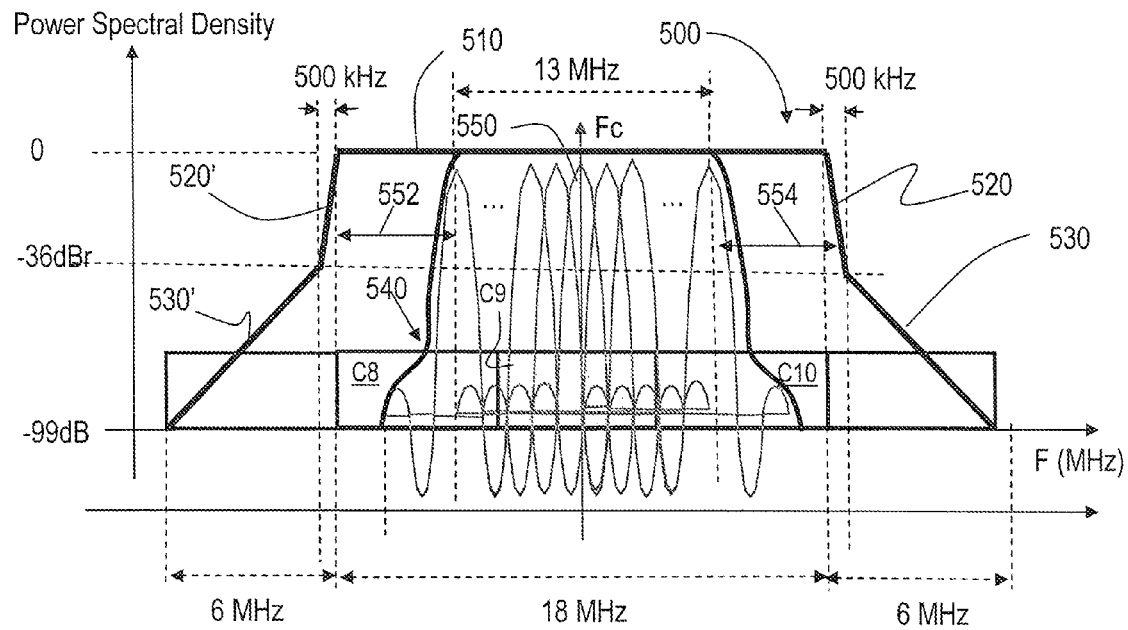
FIG. 5 depicts an emission mask for a WiFi OFDM signal according to an embodiment of the present invention.

FIG. 5 depicts a novel emission mask 500 designed for a WiFi OFDM signal 550 according to an embodiment of the present invention. FIG. 5 shows the sub-channels of the WiFi OFDM signal centered about the channel frequency denoted with $F_C$. As discussed previously, the WiFi OFDM signal uses 52 subcarriers (and 12 null subcarriers). In this embodiment, three consecutive idle TV channels are selected for transmission of the WiFi OFDM signal; these channels could be, as in the above example, channels C8, C9, and C10 of band T3 from FIG. 3. The selection is made based on the assumption that channels C8-C10 are not used locally for transmission of ATSC TV signals. It is to be noted that these channels are in the middle of the T3 band, and as such, neighboring ATSC TV channels C7 and C11 may be active. Consequently, the emission mask for this case must take into account the presence of adjacent channels C7 and C11, and be designed such that the WiFi OFDM signal does not detrimentally affect the quality of the adjacent TV channels.

As shown in FIG. 5, the emission mask 500 according to this embodiment has a somewhat different format relative to standard WiFi mask 20 shown in FIG. 2. As in the case of the spectrum mask 20, the signal plateau 510 for the maximum level extends 9 MHz on both sides of the central frequency $F_C$. However, the attenuation slope of the power curve shown by the skirts 520, 520' is very high; the power level drops dramatically in a space of only 500 kHz, declining to −36 dBr at 9.5 MHz away from the central frequency $F_C$. Power level continues to decline thereafter, as shown by slopes 530, 530' reaching −99 dBr at 15 MHz away from $F_C$.

The WiFi OFDM signal 550 of embodiment shown in FIG. 5 has an upper guard band 554 of 2.5 MHz, protecting the adjacent TV channel at the higher end of the 18 MHz whitespace band, and a lower guard band 552 of 2.5 MHz, protecting the adjacent TV channel at the lower end of the 18 MHz whitespace band. These guard bands 552, 554 are obtained with a proper implementation of the filters 706 (see FIG. 7A) which guarantees that any interference with adjacent channels meets the FCC interference regulations for TV usage in the whitespace band. FIG. 5 also shows at 540 an ideal signal spectrum; it is to be noted that in practice, filters 706 may be designed to shape the signal spectrum between mask 500 and the ideal spectrum 550.

The WiFi OFDM signal 550 is modified to match mask 500. In order to provide the upper and lower guard bands 554, 552, the spectrum actually occupied by the modified WiFi OFDM signal 450 between subcarriers 1 and 52 is only 13 MHz instead of the 16.25 MHz that would have been occupied by a standard WiFi OFDM signal. This results in a subcarrier spacing of 250 kHz (13 MHz/52 subcarriers), which is lower that the subcarrier spacing of the standard WiFi OFDM signals of 312.5 kHz.

In this example, the useful symbol duration is lengthened from 3.2 μs of the standard WiFi OFDM signal to 4 μs and the guard interval between subcarriers is proportionately increased from 0.8 us to 1.0 μs. The peak data rate is lower than for standard WiFi OFDM signals, dropping to 43.2 Mbps instead of the standard 54 Mbps, due to the increase in symbol duration from 4 μs to 5 μs. This may require the system timers to be reset. However, the decrease in peak data rate is not likely to impact the overall system throughput much, since the modified WiFi OFDM signal uses a lower frequency band (VHF/UHF) and therefore can better cope with the environmental channel statistics.

Figure 6:
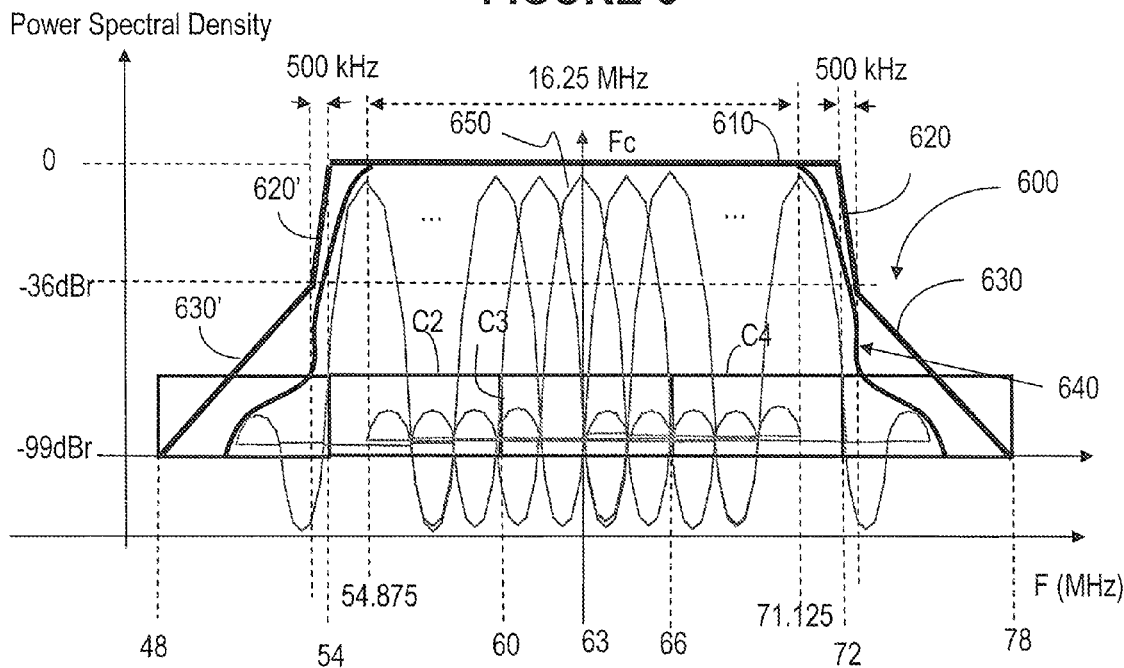
FIG. 6 depicts an alternative emission mask for an exemplary WiFi OFDM signal according to another embodiment of the present invention.

FIG. 6 depicts an emission mask 600 used for an exemplary WiFi OFDM signal 600 according to another embodiment of the present invention, suited for use in the TV band denoted with T1 in FIG. 3. As band T1 is used by only three digital TV channels, C2-C4, the design requirements for the WiFi OFDM signal in this band are more relaxed; there are no TV channels to interfere with to the right or left of this band. Emission mask 600 according to this embodiment is similar to the mask 500 shown in FIG. 5, but is translated at a different central frequency $F_C$. FIG. 6 also shows at 640 an ideal signal spectrum according to this embodiment of the invention; it is to be noted that in practice, filters 706 (see FIG. 7A) may be designed to shape the signal spectrum between mask 600 and the ideal signal spectrum 650.

FIG. 6 provides the specific value of the frequencies from the spectral mask, because the position of the channels 2-4 in the spectrum is known. Since the requirements in band T1 are more relaxed, in this embodiment the parameters of the WiFi OFDM signal 650 differ from the parameters of the WiFi OFDM signal 550. Thus, the bandwidth of signal 650 is 16.25 MHz, the same as in the case of the standard signal, but it ranges from 54.875 MHz to 71.125 MHz. The subcarrier spacing in this embodiment is 312.5 kHz (16.25 MHz/52 subcarriers), again the same as in the case of the standard signal. The symbol duration and guaranteed data rate are also consistent with the 802.11a and 802.11g standards, at 4 μs (3.2 μs for the useful symbol duration and 0.8 μs for the guard interval duration) and 54 Mbps, respectively.

FIG. 7A depicts an exemplary OFDM transmitter 700 according to one embodiment of the invention. As shown in FIG. 7A, OFDM transmitter 700 comprises a plurality of baseband blocks which may be similar to the blocks used by a conventional WiFi transmitter, such as a FEC encoder 701, an interleaver 702, a constellation mapping block 703, an OFDM symbol construction block 704, and an inverse Fourier transform block 705. The part of the transmitter 700 denoted with 750 is, however, different from that of the corresponding part of a conventional transmitter shown in FIG. 7B.

A first difference is the design of the baseband filters 706 from the filters 711 shown in FIG. 7B. As a preliminary matter, filters 706 are illustrated as one distinct unit only to provide a clear explanation of the frequency characteristics. As known in the art, signal filtering and shaping may be a multistage process rather than a one stage process. Also, filter 706 is not necessarily connected after the DAC 707. Alternatively, the DAC 707 may itself include filters that contribute to signal shaping.

Filters 706 shape the WiFi OFDM signal according to the masks 500 or 600, shown in FIG. 5 or FIG. 6, respectively. The differences between the transmit spectrum mask 20 used for conventional WiFi OFDM signals and the transmit spectrum mask 500 or 600 used for the modified WiFi OFDM signal of the invention were discussed previously.

Another difference is that transmitter 700 uses a low power amplifier or a preamplifier 708 that amplifies the symbols before modulation in the mixer (multiplier) 709. While conventional WiFi systems require a high power amplifier 714, as shown in FIG. 7a, the present invention may use a less costly preamplifier, as little power is needed to broadcast for a short distance (within a house) in the VHF/UHF band. Using an ultralow power design to cover a home environment, power may be no more than, for example, 200 mV/m.

Another difference appears in the structure of the mixers 709 of the transmitter 700, as opposed to the mixer 713 of a conventional transmitter. Transmitter 700 uses subcarriers in the VHF/UHF band, as discussed in connection with FIGS. 5 and 6, rather than in the 2.4 GHz or 5 GHz bands used for the standard WiFi OFDM signals. Therefore, mixer 709 should heterodyne the baseband signals to the center of the whitespace band in the VHF/UHF band. For the example where channels C8, C9 and C10 are bonded together to form the white-space band as in FIG. 5, mixer 709 should be designed to mix a VHF frequency corresponding to the central frequency of the band occupied by these channels. For the case when the channels 2, 3, and 4 are bonded together to form the whitespace band as in FIG. 6, the desired frequency range extends from roughly 54 MHz to 72 MHz. Mixer 709 should be designed to mix a VHF frequency of approximately 63 MHz, corresponding to the central frequency of the band T1 in this example.

Also, a VHF/UHF antenna 710 is used for transmitting the WiFi OFDM signals over short distances by transmitter 700, rater than an antenna 715 used by the conventional WiFi OFDM signals that are transmitted in the 2.4 GHz or 5 GHz bands over longer distances.

In the example of FIG. 7A, the size of the Fast Fourier Transform remains unchanged at 64, as the number of subcarriers used by the modified WiFi OFDM signal is still 64, namely 48 data subcarriers, 4 pilots and 12 null subcarriers. Among these, the twelve null subcarriers (e.g. 0, 27-37) may be used for guard bands. The four pilot subcarriers may, for example, be subcarriers 7, 21, 43, and 57.

FIG. 8A shows an exemplary OFDM receiver 800 according to one embodiment of the present invention. As shown in FIG. 8A, receiver 800 comprises a plurality of baseband units that are similar to the units used by conventional WiFi receivers. The RF part of the receiver, i.e. the antenna 801 and the RF receiving unit 802 differ from the corresponding units used by the conventional WiFi systems shown in FIG. 8B.

Thus, VHF antenna 801 is adapted to receive incoming signals in the VHF band that are broadcast over relatively short distances. The receiving unit 802 includes a Low Pass Filter (LPF) 811 that removes high frequency noise and passes the signals in the VHF band. An analog-to-digital converter (ADC) 812 of receiving unit 802 converts the received analog signal into a sequence of bits, a synchronizer 813 converts the sequence of decoding bits into a sequence of frames of bits, each of the sequence of frames having M decoding bits. In contrast, the receiving unit 820 for standard WiFi OFDM signals, shown in FIG. 8B uses a WiFi RF filter 821 suitable for the respective 2.4/5 GHz bands. As well, ADC 822 and synchronizer 823 of receiving unit 820 are designed for recovering the baseband signals from the standard WiFi band, and not the VHF band allocated to the digital TV channels.

The baseband units used by the receiver 800 operate to perform the reverse operation on the baseband signals provided by the receiving unit 802. Thus, Fast Fourier Transforming (FFT) unit 803 decodes the bits in the sequence of frames to generate a sequence of symbol frames, each of the frames having at least N time domain decoded symbols. Channel estimation and equalization unit 804 and demapper 805 process the sequence of decoding symbol frames to generate a sequence of frames of N interleaved sub-channel bits, and deinterleaver 806 processes each of the frames of N interleaved sub-channel bits to generate a stream of N recovered bits. The FEC decoder 807 performs error correction and descrambler 808 recovers the bits of the original signals.

From the above description, it will be apparent that the invention disclosed herein provides a novel and advantageous system and method for data distribution in VHF/UHF band. The foregoing discussion discloses and describes merely exemplary methods and embodiments of the present invention. One skilled in the art will readily recognize from such discussion that various changes, modifications, and variations may be made therein without departing from the spirit and scope of the invention. Accordingly, disclosure of the present invention is intended to be illustrative, but not limiting, of the scope of the invention, which is set forth in the following claims.

What is claimed is:

1. A method of transmitting user data within a communication band, over a local area network (LAN), comprising:
   identifying in the communication band a whitespace band available in an area of operation of the LAN;
   generating a baseband WiFi orthogonal frequency division multiplexing (OFDM) signal from user data;
   reconfiguring the baseband WiFi OFDM signal into a modified WiFi OFDM signal using a transmit spectrum mask that defines the bandwidth of the modified WiFi OFDM signal in the whitespace band and attenuates the modified WiFi OFDM signal at the edges of the whitespace band for maintaining a performance of any neighboring licensed primary service, wherein the bandwidth of the modified WiFi OFDM signal is based at least in part on whether the whitespace band is in a first portion of the communication band or not in the first portion; and
   transmitting the modified WiFi OFDM signal over the whitespace band.

2. The method of claim 1
wherein when the whitespace band is in the first portion of the communication band, the bandwidth occupied by the modified WiFi OFDM signal is 16.25 MHz, and
when the whitespace band is not in the first portion of the communication band, the bandwidth occupied by the modified WiFi OFDM signal is 13 MHz.

3. The method of claim 2, wherein the first portion of the communication band includes digital TV channels 2-4.

4. The method of claim 1, wherein the bandwidth occupied by the modified WiFi OFDM signal is 16.25 MHz when the whitespace band is in the first portion of the communication band.

5. The method of claim 4, wherein the transmit spectrum mask has a plateau of 18 MHz around a central frequency to enable a maximum amplitude for the modified WiFi OFDM signal and an attenuation of −99 dB over 6 MHz from edges of the plateau.

6. The method of claim 5, wherein the transmit spectrum mask includes sharp attenuations of −36 dB at the edges of the plateau over 500 kHz.

7. The method of claim 4, wherein the modified WiFi OFDM signal has a symbol duration of 4 μs, including 3.2 μs as a useful signal duration and 0.8 μs as a guard interval duration.

8. The method of claim 7, wherein the modified WiFi OFDM signal has a subcarrier spacing of 312.5 kHz.

9. The method of claim 4, wherein the modified WiFi OFDM signal includes a data rate of 54 Mbps.

10. The method of claim 1, wherein the bandwidth occupied by the modified WiFi OFDM signal is 13 MHz when the whitespace band is not in the first portion of the communication band.

11. The method of claim 10, wherein the transmit spectrum mask has a plateau of 18 MHz around a central frequency to enable a maximum amplitude for the modified WiFi OFDM signal and an attenuation of −99 dB over 6 MHz from edges of the plateau.

12. The method of claim 11, wherein the transmit spectrum mask includes sharp attenuations of −36 dB at the edges of the plateau over 500 kHz.

13. The method of claim 10, wherein the modified WiFi OFDM signal has a symbol duration of 5 μs, including 4 μs as a useful signal duration and 1 μs as a guard interval duration.

14. The method of claim 13, wherein the modified WiFi OFDM signal has a subcarrier spacing of 250 kHz.

15. The method of claim 10, wherein the modified WiFi OFDM signal includes a data rate of 43.2 Mbps.

16. The method of claim 1, wherein the modified WiFi OFDM signal is modulated over 48 data carriers and uses 4 pilot carriers in the whitespace band.

17. The method of claim 1, wherein the whitespace band extends over a band around a central frequency in a portion of the spectrum allocated to digital TV between 54 MHz and 698 MHz.

18. A transmitter that broadcasts user data over a local area network (LAN) within a whitespace band in a communication band, where the whitespace band is not currently used in an area of operation of the LAN for transmission of licensed primary services, comprising:
- a baseband generator configured to generate a baseband WiFi orthogonal frequency division multiplexing (OFDM) signal from the user data;
- a frequency converter configured to reconfigure the baseband WiFi OFDM signal into a modified WiFi OFDM signal using a transmit spectrum mask that defines the bandwidth of the modified WiFi OFDM signal in the whitespace band and to attenuate the modified WiFi OFDM signal at the edges of the whitespace band for maintaining a performance of any neighboring licensed primary service, wherein the bandwidth of the modified WiFi OFDM signal is based at least in part on whether the whitespace band is in a first portion of the communication band or not in the first portion; and
- a transmitter configured to transmit the modified WiFi OFDM signal over the whitespace band.

19. The transmitter of claim 18, wherein when the whitespace band is in the first portion of the communication band, the bandwidth occupied by the modified WiFi OFDM signal is 16.25 MHz, and
when the whitespace band is not in the first portion of the communication band, the bandwidth occupied by the modified WiFi OFDM signal is 13 MHz.

20. The transmitter of claim 19, wherein the first portion of the communication band includes digital TV channels 2-4.

21. The transmitter of claim 18, wherein the bandwidth occupied by the modified WiFi OFDM signal is 16.25 MHz when the whitespace band is in the first portion of the communication band.

22. The transmitter of claim 21, wherein the transmit spectrum mask has a plateau of 18 MHz around a central frequency to enable a maximum amplitude for the modified WiFi OFDM signal and an attenuation of −99 dB over 6 MHz from edges of the plateau.

23. The transmitter of claim 22, wherein the transmit spectrum mask includes sharp attenuations of −36 dB at the edges of the plateau over 500 kHz.

24. The transmitter of claim 21, wherein the modified WiFi OFDM signal has a symbol duration of 4 µs, including 3.2 µs as a useful signal duration and 0.8 µs as a guard interval duration.

25. The transmitter of claim 24, wherein the modified WiFi OFDM signal has a subcarrier spacing of 312.5 kHz.

26. The transmitter of claim 21, wherein the modified WiFi OFDM signal includes a data rate of 54 Mbps.

27. The transmitter of claim 18, wherein the bandwidth occupied by the modified WiFi OFDM signal is 13 MHz when the whitespace band is not in the first portion of the communication band.

28. The transmitter of claim 27, wherein the transmit spectrum mask has a plateau of 18 MHz around a central frequency to enable a maximum amplitude for the modified WiFi OFDM signal and an attenuation of −99 dB over 6 MHz from edges of the plateau.

29. The transmitter of claim 28, wherein the transmit spectrum mask includes sharp attenuations of −36 dB at the edges of the plateau over 500 kHz.

30. The transmitter of claim 27, wherein the modified WiFi OFDM signal has a symbol duration of 5 µs, including 4 µs as a useful signal duration and 1 µs as a guard interval duration.

31. The transmitter of claim 30, wherein the modified WiFi OFDM signal has a subcarrier spacing of 250 kHz.

32. The transmitter of claim 27, wherein the modified WiFi OFDM signal includes a data rate of 43.2 Mbps.

33. The transmitter of claim 18, wherein the modified WiFi OFDM signal is modulated over 48 data carriers and uses 4 pilot carriers in the whitespace band.

34. The transmitter of claim 18, wherein the whitespace band extends over a band around a central frequency in a portion of the spectrum allocated to digital TV between 54 MHz and 698 MHz.

* * * * *